United States Patent [19]

Fogelberg

[11] 4,364,994

[45] Dec. 21, 1982

[54] PROCESS AND COMPOSITION FOR MINIMIZING ACCUMULATION OF MOISTURE ON A COLD SURFACE EXPOSED TO HUMID CONDITIONS AND PRODUCT OBTAINED THEREBY

[75] Inventor: Ernst R. Fogelberg, Vällingby, Sweden

[73] Assignee: AB Bonnierföretagen, Stockholm, Sweden

[21] Appl. No.: 182,625

[22] Filed: Aug. 29, 1980

[51] Int. Cl.$^3$ .............................................. B05D 5/04
[52] U.S. Cl. .................................. 428/316.6; 252/62; 106/86; 428/317.9; 428/409; 427/385.5; 427/421
[58] Field of Search ............... 427/421, 385.5, 204, 427/403, 426; 52/404, 408; 252/62; 106/86; 260/32.6 R, 42.52; 428/372, 393, 405, 409, 451, 316.6, 317.9

[56] References Cited

U.S. PATENT DOCUMENTS

| | | | |
|---|---|---|---|
| 2,077,094 | 4/1937 | Byers | 252/62 |
| 2,804,437 | 8/1957 | Katz et al. | 260/32.6 R |
| 3,244,632 | 4/1966 | Schulz et al. | 252/62 |
| 3,676,197 | 7/1972 | Harrison et al. | 427/426 |

*Primary Examiner*—Shrive P. Beck
*Attorney, Agent, or Firm*—Gordon W. Hueschen

[57] ABSTRACT

The accumulation of moisture on a cold surface exposed to humid conditions which tend to cause condensation on said surface is minimized by applying a coating to the surface which contains unoccluded, water-absorptive particles in admixture with a resinous binder in an amount sufficient to bind the particles together in a adherent coating on the surface, but insufficient to occlude the water absorptivity of the particles. The particles comprise a mixture of cellulosic fibers and water-absorptive, inorganic particles having a bulk density less than 150 kgs/m$^3$.

16 Claims, No Drawings

PROCESS AND COMPOSITION FOR MINIMIZING ACCUMULATION OF MOISTURE ON A COLD SURFACE EXPOSED TO HUMID CONDITIONS AND PRODUCT OBTAINED THEREBY

FIELD OF INVENTION AND PRIOR ART

The invention relates to a process and a composition for minimizing accumulation of moisture on a cold surface exposed to humid conditions which tend to cause condensation on the surface and to the product obtained therefrom.

A long-standing problem has been the formation of condensates on the interior surface of uninsulated roofs and walls usually found in high-volume buildings, such as storage spaces, hangers, halls of different kinds, etc. Many attempts have been made to solve this difficult problem manifesting itself in the formation of condensate to such an extent that run-off by dripping or coherent flow will result. The problem is multi-faceted, since the solution of the problem by application of different forms of insulating material in turn results in phenomena in the form of problems of supporting ability of the construction, corrosion between support and insulation, increase in construction costs, etc. Moreover, it is desirable on the one hand to apply the insulation in connection with the manufacture of the building material in question and on the other hand to apply the insulation on existing construction in a simple manner without need for disassembling the construction.

In an attempt to solve the problem of the formation of condensate, compositions have been prepared including binder and so-called diatomite, i.e., the naturally-occurring material kieselguhr, and some advantageous effects have been obtained, but the problem has not up to now received a satisfactory solution. Among the disadvantages connected with these prior art compositions, it can be mentioned that they require relatively high contents of inorganic material that, in view of the formation of cracks, the composition must contain a fiber material, such as asbestos, and that the drying does not proceed in a satisfactory way, especially at high layer thickness.

It has also been proposed to coat such surfaces with cellulosic fibers and a binder therefor sprayed from separate spray nozzles onto the surface. This process has not proved practical, however, because it is difficult to obtain a coating which, when it is weighted down with absorbed moisture, will adhere to the surfaces treated.

OBJECTS OF THE INVENTION

It is an object of the invention to provide a process and composition which is effective to coat uninsulated cold surfaces for the purpose of protecting them against accumulation of moisture thereon due to condensation.

It is a further object of the invention to provide a process and a composition which is water-absorptive and which adheres to the surface over repeated absorption and evaporation cycles. It is a further object of the invention to provide a process and composition which is economical to prepare and to apply. A further object of the invention is to provide a surface having an absorbent coating, whereby condensate is absorbed in the coating during cold spells and evaporated therefrom during warm spells.

Further objects of the invention are to avoid the disadvantages of the prior art and to obtain such advantages as will appear as the description proceeds.

BRIEF DESCRIPTION OF THE INVENTION

In my copending U.S. application, Ser. No. 800,200, filed May 25, 1977, the disclosure of which is incorporated herein by reference, I have described a process and composition in which the objects of the invention are accomplished by coating the surface, which is either cold or likely to become cold, with a coating containing water-absorptive particles or granules of an expanded, insoluble, inorganic material having a bulk density of at most 150 kgs/m$^3$ in admixture with a binder in proportion such that the water-absorptivity of the granules is not occluded by the binder. By this process and composition the problem of crack formation associated with the prior art has been avoided, so that it is not necessary to include a fibrous material, for example, asbestos.

It has now been found that the advantages of my prior invention can be preserved and at the same time greater absorptivity imparted thereto by including cellulose fibers in the composition. Thus, the water-absorptive particles in accordance with the present invention comprise a mixture of the cellulose fibers and water-absorptive, heat-expanded, inorganic particles having a bulk density of at most 150 kgs/m$^3$.

Quite generally, the composition of the present invention behaves in the same manner as that of my previous invention. However, the presence of cellulose fiber in the composition of the present invention give specific advantages, among which the following are of particular interest.

(a) By using cellulosic fibers less binder may be used, which, in addition to the economical advantage thereof, results in lower weight per unit of volume and lower shrinkage when drying after application to, for example, a metal sheet.

(b) The product gives better strength and better binding to the substrate since the presence of cellulosic fibers provides for a reinforcing effect.

(c) The presence of cellulosic fibers imparts better affinity to water to the product.

(d) The presence of cellulosic fibers, especially when refined and bleached cellulosic fibers are used, means that a lower percentage of pigments can be used, resulting in high absorption capacity.

(e) The fact that the product when drying is subject to reduced shrinkage means an increase in absorption capacity and above all an improvement of heat insulation capacity.

While the invention is not to be bound to any particular theory, it seems that the rough surface of the expanded, inorganic material aids in the binding in the covering layer and improves the moisture absorption in view of the enlargement of the surface resulting from the roughness imparted by the granules. Also, the cellulose fibers augment this roughness and, in addition, act as wicks to lead moisture into and out of the interior of the coating by the capillary action of the fibers.

The process according to the invention can be carried out either in connection with the preparation of prefabricated material or, can be carried out on existing building construction.

Depending on the material to be protected, for instance, sheet metal, inorganic materials, such as eternite, plastic material or mortar, it may be advantageous for the binding of the protective material to the substrate to apply a so-called primer to the surface before the application of the protective material. The protective material in the form of a coating compostion is applied to the surface in question to a certain desired thickness, for instance, 0.5–10 mm, and preferably about 1–5 mm. The composition can be applied in any manner, for instance, by brush coating, roller coating, or spray coating, and the latter procedure is preferred in connection with application of the composition on existing construction.

The expanded, inorganic material distributed in the composition in the form of granules can have a varying bulk density, and quite generally, it is preferred that the bulk density is less than about 150 kgs/m$^3$. A preferred range is 20–150 kgs/m$^3$ and the range 50–90 kgs/m$^3$ is particularly preferred. Different inorganic materials are conceivable, but a particularly preferred material is so-called heat-expanded perlite. Perlite is a mineral existing in nature and consisting of liparite or quartz prophyry glass. This natural material of a volcanic origin contains confined water and, when the material is crushed and heat treated, it expands greatly in view of the evaporization of the water, and occupies a substantially enlarged volume, which gives it excellent water absorptivity. It also gives it good insulating properties which cooperate with the water absorptivity to minimize condensation and dripping.

By using an expanded, inorganic material in granule form in conformity with the present invention, surprisingly good anti-condensation characteristics are obtained at relatively low content of granulate. A preferred range is 5–20 percent by weight based on the composition before application, particularly 8–15 percent by weight and especially about 10 percent by weight.

The granulate is preferably not too fine-grained, since it has been shown that relatively coarse granules impart particularly good absorption characteristics to the coating applied. A grain size of up to a few millimeters thus gives excellent results, and the range up to about 1.5 mm is particularly preferred. The lower limit, with regard to the grain size, is not critical, but the fraction of fines should, of course, not be too high in view of the fact that this results in practical inconveniences in the form of dusting, and the like. A practical lower limit with regard to grain size, can be said to be about 0.01 mm.

Any fibrous form of cellulose can be used, but one of wood origin is preferred, such as the so-called "hardwood" and "softwood" cellulosic fibers. While originally, these terms denoted source, they have now become associated with the length of the fibers. Thus, hardwood fibers may have a fiber length of about 3 to 5 millimeters whereas, the softwood fibers are somewhat shorter. The shorter fibers are preferred and sometimes it is expedient to run the cellulose fibers through a shear or hammermill with a clearance of about 1.5 mm in order to provide fibers in the order of about 1.5 mm length.

Any high-grade cellulose fibers can be used, but it is preferred to use those which have been chemically refined and bleached to provide a white, soft, absorbent material. The so-called "Baby Diaper Cellulose" are "R-FLUFT" from Rottuevoss, Sweden, are particularly suitable.

It is sometimes desirable to pretreat the cellulose fibers with a flame retardant, such as a phosphate, for obtaining flame resistance and for the formation of a carbon skeleton when the coating is excessively heated.

The compositions of this invention contain volatile liquid vehicle having a resinous binder dissolved or dispersed therein, and expanded granules distributed therein and, advantageously, a wetting agent by which the granules have been pretreated. This wetting agent remains in the dried coating and results in the improved moisture-absorptive ability of the final insulating coating. The wetting agent is supplied in relatively small amounts, suitably in an amount of from about 0.1 percent to about 2 percent by weight based on the composition.

In addition to said constituents, the composition may contain a pigment of the desired type, for instance, a white pigment, such as $TiO_2$, or a colored pigment, such as iron oxide red, iron oxide yellow, chromohydroxide green, phthalocyanine blue, phthalocyanine green, soot, etc., depending on the color desired. To fill up the cavities between the granules, it is suitable to include in the composition also, a so-called extender, which can consist of talcum, calcium carbonate, microdolomite, $SiO_2$ or kaolin. The amounts of extender and pigment are not critical and are adjusted in relation to the composition of the material. A suitable range of each is about 3 percent to about 15 percent by weight based on the weight of the composition before its application. Any conventional binder of the paint art can be used as a binder. The binder may, of course, be selected in accordance with the particular application, the desired fire-resistancy, etc., but the character of the binder is not critical for providing the desired effect of preventing formation of condensate. Among suitable binders there may be mentioned homo or copolymerisates dispersible or emulsifiable in water, for instance, of the type polyvinyl acetate or polyvinyl acrylate. Moreover, homo- or copolymerisates dissolved in a solvent may be mentioned. Furthermore, oxidatively drying binders, for instance, vegetabilic oils, such as linseed oil, alkyds, and etc.

Another type of binder is the curing type of binder, for instance, two-component systems, such as epoxy binders.

The amount of binder can be varied widely in accordance with know practices in the art, provided sufficient is used to cause the granules and the fibers to adhere to each other and to the material coated, but not so much as to occlude the water absorptivity of the heat-expanded granules and the cellulose fibers.

When a particularly pronounced fire-resistancy is desirable, inorganic binders can be used, for instance, of the water glass type. When in this disclosure it is said that the composition includes binder and solvent it is meant that the composition may contain only binder and solvent included therein or binder together with further solvent.

The compositions of the invention are coating compositions of the character commonly known in the art as paints and are applied in the same manner as paints are applied. The compositions contain a volatile liquid which evaporates after the coating is applied and they may be painted on any suitable surface by brush coating, spray coating, roller coating, or the like. It is thus applied directly to the surface to be protected as a liquid coating composition which sets up in situ and can be applied to the finished structure or to component prefabricated parts thereof.

The invention also covers the finally insulated product, i.e., substrate, together with insulating coating.

DETAILED DESCRIPTION OF THE INVENTION

The invention may be more fully understood by reference to the following example in which the parts and percentages are by weight unless otherwise specified.

EXAMPLE

A coating composition was prepared by mixing the following ingredients:

| | |
|---|---|
| Water | 20.0 |
| Hydroxyethyl cellulose 2%-visc. adjust. (thickener) (Natrosol ® HR, Hercules AB, Sweden) NH$_4$OH pH adjusted to pH 8 (thickener) | 10.0 |
| Polyphosphate wetting/dispersing agent (surface active agent) | 0.1 |
| Polyglycol ester emulsifier (Arkopal N-090, Hoechst AG, Germany West) (emulsifying agent) | 0.5 |
| Antifoam agent (Antifoam Troy 999, Troy, USA) (surface active agent) | 0.5 |
| Ethylene glycol | 3. |
| TiO$_2$ Pigment | 5.0 |
| Talcum - 20 μm | 6.0 |
| Vinyl-acrylic copolymer (Mowilith 5152-5, Hoechst AG, Germany West) 50% solids in H$_2$O | 30.0 |
| Cellulose fiber (Baby Diaper Grade) | 2.0 |

In parallel therewith there is prepared a mixture of water as a solvent (34.0 parts by weight), soya lecithin as a wetting agent (1.0 part by weight) and a granulate of heat-expanded perlite, bulk density 60–70 kgs/m$^3$ (10 parts by weight).

The above components prepared separately are mixed to a coating composition, which can be applied by spraying with a spray gun. The coating composition was applied underneath to an uninsulated roof of iron sheet subjected to temperature variations within the range of −10° to +20° C. on the outer side and −6° to +18° C. on the inside at a relative humidity varying between 60 and 95 percent. The composition was applied to a thickness of about 1.5 mm, and on the coated surfaces no condensation can be seen in the form of dropping from the roof, which normally constitutes a difficult problem in connection with roofs in an uninsulated state. The effect obtained by using the coating composition according to the invention is in principle based on two effects, namely, the effect due to the insulating and the water-absorbing characteristics of the layer. If, at extreme conditions, condensation occurs on the coating, the moisture is distributed in the surface layer without dropping occurring, and the moisture evaporates later when conditions of higher temperature and/or lower atmospheric humidity exist.

The granules (perlite) used in this example have the following approximate chemical composition:

| Silica | SiO$_2$ | 71–75 | percent by weight |
|---|---|---|---|
| Alumina | Al$_2$O$_3$ | 12.5–18 | percent by weight |
| Potassium oxide | K$_2$O | 4–5 | percent by weight |
| Sodium oxide | Na$_2$O | 2.9–4 | percent by weight |
| Calcium oxide | CaO | 0.5–2 | percent by weight |
| Iron oxide | Fe$_2$O$_3$ | 0.5–1.5 | percent by weight |
| Magnesia | MgO | 0.1–0.5 | percent by weight |
| Total chlorides maximum | | 0.2 | percent by weight |

The particle size of the granules lies within the range of 0.01–1.5 mm. Preferred weight ranges and preferred weight fraction for the constituents of the instant example are given in the table below, also shown in percentages by weight unless otherwise indicated:

| | Range | Preferably about |
|---|---|---|
| Vinyl-acrylic copolymer | 15–40 | 30 |
| Wetting agent | 0.05–0.5 | 0.1 |
| Emulsifier | 0.05–0.5 | 0.1 |
| Titanium dioxide | 3–15 | 5 |
| Anti-foam agent | 0.1–1 | 0.5 |
| Talcum | 3–15 | 6.0 |
| Ethylene glycol | 1–5 | 3.0 |
| Water | 20–40 | 34 |
| Soya lecithin | 0.5–2 | 1 |
| Granulate (perlite) | 5–15 | 10 |
| Cellulose fibers | 1–5 | 2 |

It can be seen from a comparison of the above example with the parent case, that there is a significant reduction of contents of copolymer, namely, from 40 percent to 30 percent by weight, which constitutes an important economic advantage in addition to the fact that the physical strength of the dried product is improved. It is believed that this is due in part to the use of a volatile liquid vehicle for the composition, which evaporates after the composition is applied. It is believed that this vehicle saturates the pores of the absorbent particle, i.e., the cellulose fibers and the heat-expanded perlite and helps prevent them from being occluded by binders, and the like. Moreover, as the vehicle evaporates from the dry or drying coating, the pores are cleansed of any possible occlusion.

The pigment TiO$_2$ used in the above example may be replaced by colored pigments, as desired, with regard to the color of the coating, such as iron oxide red, iron oxide yellow, chromo hydroxide green phthalocyanine blue, phthalocyanine green, soot, and etc.

By applying the technique of this invention, essential advantages are obtained in connection with insulation of roof or wall constructions of current interest. Among these advantages, the following may be mentioned:

The layer resulting from the coating composition gives an effective insulation and thus a significantly reduced formation of condensate.

Condensates formed in spite of this, are distributed over a larger surface or absorbed in the coating itself, in view of the roughness of the surface and the contents of the granules of inorganic material; water absorptivity due to the fibers of the cellulose thus reduce the risk that dropping shall occur.

The composition can be applied in one step to form a relatively thick coating without any drying problems arising. The composition need not contain fiber material such as asbestos in order that cracking shall be avoided.

To further illustrate the advantages of the invention, comparative tests have been made, which are presented in the table below:

TABLE

| Period of time | H | A |
|---|---|---|
| 10 min. | — | — |
| 15 min. | — | — |
| 30 min. | — | — |
| 45 min. | — | — |
| 1 hour | — | — |
| .2 hours | — | — |
| 2 hours | — | — |
| 4 hours | — | — |

TABLE-continued

| Period of time | H | A |
|---|---|---|
| 5 hours | — | — |
| 6 hours | — | — |
| 7 hours | — | — |
| 8 hours | — | — |
| 9 hours | — | x |
| 10 hours | — | 1.0 |
|  | after completed testing, the surface is completely dry | |

In the testing on condensation, the apparatus employed was as described in Ministry of Work's specification D.D.F. B./111 and consisted of several identical copper canisters mounted on an iron framework. Each canister was in the form of a cylinder open at the top and closed at the bottom by a right-angled cone. The copper canisters were coated externally with the materials under test to give coatings of the thicknesses indicated below. The canisters were attached to the iron framework and then filled with ice and water. Under these conditions, moisture was gradually deposited on the coating by condensation and commenced to drip from the bottom of the canisters. The drops were caught in measuring cylinders and the amount of water collected was noted periodically. The temperature difference in the tests was 22° C., i.e., the difference between +25° C. being the environmental temperature and +3° C. being the temperature of the ice water used. The relative humidity was 60–65 percent.

In the table, x refers to the time of the first water drop run off, whereas the figures refer to the collected amount of water in mililiters. The column designated H refers to the composition of the present application; that designated A refers to the composition of Example 2 of the parent application.

It can be seen from a comparison the data given in column H and A that, in the comparative tests, run-off in the material without cellulose began after nine hours whereas, with that which contained cellulose, the material was completely dry after ten hours when the test was terminated.

It is to be understood that the invention is not to be limited to the exact details of operation or structure shown and described, as obvious modifications and equivalents will be apparent to one skilled in the art.

I claim:

1. A process for minimizing accumulation of moisture on a cold surface exposed to humid conditions which tend to cause condensation on the surface, which comprises painting said surface with a liquid coating composition having dispersed in a volatile vehicle water-absorptive particles in admixture with a resinous binder in an amount sufficient to bind said particles together in an adherent coating on said surface but insufficient to occlude the water absorptivity of the particles, said particles comprising a mixture of cellulose fibers and water-absorptive, heat-expanded perlite having a bulk density less than 150 kgs/m$^3$, the pores of which particles are filled with said volatile vehicle when the liquid coating composition is applied, and allowing or causing the volatile vehicle to evaporate from the applied coating and from the pores of the particles therein, and in which the heat-expanded perlite is present in an amount of about 5 percent to about 15 percent by weight, the cellulose fibers are present in an amount of about 1 percent to about 5 percent by weight, the binder is present in an amount of about 15 percent to about 40 percent by weight and, the volatile vehicle in the amount of about 20 percent to about 45 percent by weight.

2. A process of claim 1, in which the coating composition contains surface-active materials having wetting-out properties which promote absorption of moisture into the dried coating composition.

3. A process of claim 2, in which the binder is vinyl acrylic copolymer.

4. A process of claim 2, in which the cellulose fibers are refined, bleached, short-fibered cellulose.

5. A process of claim 1, in which the coating is applied to a thickness of about 0.05 mm to about 5 mm.

6. A process of claim 4, in which the coating is applied to a thickness of about 0.05 mm to about 5 mm.

7. An article of manufacture comprising a surface which, in its unprotected state, tends to accumulate moisture thereon when the surface is cold and the ambient atmosphere is humid, which surface has a coating adhered thereto which is porous, so that moisture condensing thereon is absorbed into the coating and in which the porosity is imparted thereto by water-absorptive particles which comprises a mixture of cellulose fibers and water-absorptive, heat-expanded perlite having a bulk density less than 150 kgs/m$^3$, which coating contains a resinous binder which binds the coating to the surface and the cellulose fibers and the heat-expanded perlite together without occlusion of the porosity thereof and having been deposited thereon from a volatile vehicle which initially filled the pores of said particles but which is evaporated from the applied coating and from the pores of the particles therein.

8. An article of manufacture according to claim 7, in which said water-absorptive particles comprise approximately equal portions by volume of the heat-expanded, perlite and the cellulose fibers.

9. An article of manufacture according to claim 7, in which the heat-expanded perlite is present in an amount of about 15 percent to about 40 percent by weight, the cellulose fibers are present in an amount of about 1 percent to about 5 percent by weight, the binder is present in an amount of about 15 percent to about 40 percent by weight and, the volatile vehicle in the amount of about 20 percent to about 45 percent by weight.

10. An article of manufacture according to claim 7, in which the coating composition contains surface-active materials having wetting-out properties which promote absorption of moisture into the dried coating composition.

11. An article of manufacture according to claim 9, in which the coating composition contains surface-active materials having wetting-out properties which promote absorption of moisture into the dried coating composition.

12. An article of manufacture according to claim 11, in which the cellulose fibers are refined, bleached, short-fibered cellulose.

13. An article of manufacture according to claim 11, in which the coating is applied to a thickness of about 0.05 mm to about 5 mm.

14. An article of manufacture according to claim 11, in which the binder is vinyl acrylic copolymer.

15. An article of manufacture according to claim 7, in which the cellulose fibers are refined, bleached, short-fibered cellulose.

16. An article of manufacture according to claim 7, in which the coating is applied to a thickness of about 0.05 mm to about 5 mm.

* * * * *